United States Patent [19]
Berland

[11] Patent Number: 5,282,238
[45] Date of Patent: Jan. 25, 1994

[54] FACSIMILE RADIO COMMUNICATION SYSTEM

[75] Inventor: Kerry Berland, Chicago, Ill.

[73] Assignee: Silicon Engines, Ltd., Chicago, Ill.

[21] Appl. No.: 685,831

[22] Filed: Apr. 16, 1991

[51] Int. Cl.⁵ .......................................... H04M 11/06
[52] U.S. Cl. ..................................... 379/58; 379/100; 358/404; 358/405; 358/431; 358/442; 358/444
[58] Field of Search ........................... 379/58, 59, 100; 370/94.1, 95.1, 95.3; 358/400, 401, 404, 405, 407, 409, 431, 434–436, 439, 442, 443, 444, 445, 468, 476

[56] References Cited

U.S. PATENT DOCUMENTS

| | | | |
|---|---|---|---|
| 4,549,219 | 10/1985 | Sue et al. | 358/405 |
| 4,663,706 | 5/1987 | Allen et al. | 350/94.1 |
| 4,665,519 | 5/1987 | Kirchner et al. | 370/94.1 |
| 4,837,812 | 6/1989 | Takahashi et al. | 379/100 |
| 4,914,716 | 4/1990 | Takahashi et al. | 379/100 |
| 4,922,546 | 5/1990 | Takahashi et al. | 379/100 |
| 4,933,770 | 6/1990 | DeSpain | 379/100 |
| 4,977,609 | 12/1990 | McClure | 379/59 |
| 5,090,049 | 2/1992 | Chen | 379/100 |
| 5,119,210 | 6/1992 | Baba | 358/404 |
| 5,191,441 | 3/1993 | Suzuki et al. | 358/444 |

FOREIGN PATENT DOCUMENTS 0081376 5/1983 Japan .................................. 358/444

OTHER PUBLICATIONS

Technical disclosure: Morrison & Dempsey Communications "AB3X Cellular Interface Owner's Manual", 1987.

Primary Examiner—Jin F. Ng
Assistant Examiner—Dwayne D. Bost
Attorney, Agent, or Firm—Lockwood, Alex, Fitzgibbon & Cummings

[57] ABSTRACT

A communication system which enables conventional telephone-type facsimile apparatus to reliably and efficiently communicate over a conventional two-way voice radio communication system. The system includes an interface unit which is connected to the facsimile apparatus and to the transceiver apparatus of the radio communication system without modification to either unit. The interface unit transmits and receives information over the radio system in the form of a series of data packets, each containing origin address, destination address, send sequence and check digit information for optimum transmission accuracy and efficiency. A confirmation packet of like send sequence sent by the receiving unit when received at the transmitting unit verifies transmission. In the absence of such verification the data packet is retransmitted.

3 Claims, 3 Drawing Sheets

Typical Data Packet

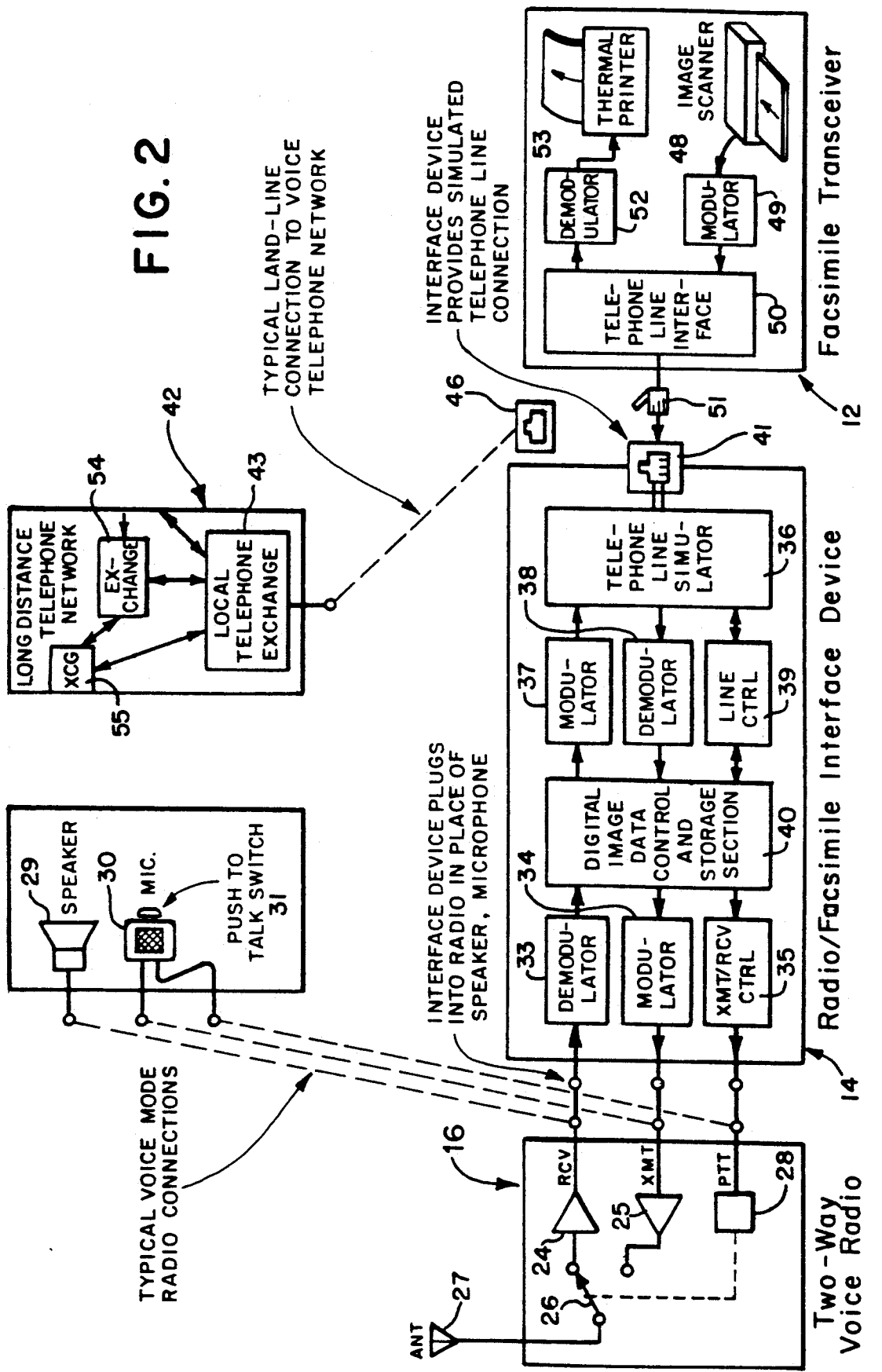

FACSIMILE RADIO COMMUNICATION SYSTEM

BACKGROUND OF THE INVENTION

This invention relates in general to a communications interface device whereby a facsimile transceiver is enabled to send and receive copies of documents over a two-way voice radio transceiver; and more particularly to a communications interface device which contains electrical interface means which, when connected to a standard facsimile transceiver, simulate a two-wire public switched telephone line; which contains facsimile data modulator and demodulator means for converting facsimile image data into audible tones, and audible tones into facsimile image data; which contains destination addressing means to allow a user to selectively transmit a facsimile message to any one of multiple compatible devices on the same radio channel; which provides error detection and correction means which assure error-free communications over the radio channel; and which contains radio interface means which, connected to a voice radio, simulate an external microphone, talk switch, and speaker.

Facsimile transceivers have commonly been used to send and receive copies of written documents over two-wire voice telephone lines. Such a facsimile transceiver contains station selection (dialing) means to place calls over the public switched voice telephone network; answering means to detect ringing signals from the telephone central office; and electrical coupling means to send and receive analog electrical signals in the voice frequency range, at signal levels and frequencies compatible with the voice telephone network. Such a facsimile transceiver also contains optoelectronic document scanning means, which, for each horizontal scan line of a predetermined height across the document to be copied, produce a string of digital data, where for example a binary one digit represents a black picture element of a predetermined size, and a binary zero digit represents a white picture element. Such a transceiver also contains modulation means which, for transmission, convert digital image data into tones in the voice frequency range, as well as demodulation means which, for reception, convert audio tones into binary image data. Such a facsimile transceiver also contains hardcopy printing means, such as a thermal print mechanism which makes images by selectively heating elements on a thermal print head in contact with thermally-sensitive paper, or a laser print mechanism which produces images on bond paper using a xerographic process, or similar print mechanism; such printing means convert the received digital image data into a printed document, reproducing a copy of the transmitted document. Such facsimile transceiver also includes a timing and control means which control and coordinate the above elements in accordance with procedures and protocols established by telephone authorities and by international telecommunications standards bodies.

There are many applications in which it would be desirable to send and receive documents using such a facsimile transceiver, but where telephone lines are not available. Examples include mobile vehicles, temporary work locations, and remote and undeveloped areas.

Various means have been developed to send and receive digital data over wireless radio links. A radio modem for example may be connected between a computer or data terminal and a radio transceiver. The means for data transfer between the computer or data terminal and the radio modem comprise a direct electrical connection of two closely-located data devices, for example, an RS-232 serial data interface (Electrical Industries Association Standard RS-232). The radio modem contains means for converting digital data received from the computer or data terminal into electrical signals which modulate the carrier of the connected transceiver. Conversely, the radio modem demodulates signals received from the radio so as to regenerate digital data, and passes the data to the connected computer or data terminal. However, a facsimile transceiver cannot be connected to such a radio modem, which lacks the telephone line interface means required for communicating with standard facsimile transceivers.

Other means have been developed to allow devices with telephone-line interfaces—telephone sets, data modems, and the like—to communicate over wireless radio links. A radiotelephone set for example contains telephone line simulation means, coupled to or combined with a radio transceiver. If a facsimile transceiver were connected at each side, two radiotelephones could send and receive messages. Unfortunately, communications errors may frequently be introduced by noise and interference on the radio communications bands, and such a radiotelephone set does not contain means for detecting and correcting such errors. A short burst of noise that may only be annoying in a voice conversation can render unintelligible several lines of image data in a facsimile transceiver connection. Furthermore, a radiotelephone system is generally restricted to only two stations, because neither the radiotelephone set nor the facsimile transceiver contains means for selectively transmitting to one of several stations which use the same communications channel. Still further, some radiotelephones use two radio frequencies, one for each voice direction. In urban and other developed areas, available radio channels are scarce, and licensing authorities are reluctant to assign channels to parties of only two users, the more so where two radio channels are required by each system. These factors limit the usefulness of radiotelephone equipment for facsimile communications.

Means have also been developed recently which allow devices with telephone-line interfaces to communicate over cellular telephone systems. Such a cellular telephone interface device contains a telephone line simulation means, combined with a cellular telephone interface means. If a facsimile transceiver were connected to such a device, it could send and receive messages over the cellular telephone network. Unfortunately, as with radiotelephones, communications errors may frequently be introduced by noise and interference on the radio communications channels. Further, cellular systems periodically switch the radio channel in use from one frequency to another, to improve signal strength for moving cellular telephones, and even with fixed stations to balance channel usage; such channel switching causes brief lapses in communications which are only a minor disturbance for voice conversations, but result in data errors for facsimile equipment. Such a cellular telephone interface device does not provide means for detection and correction of communications errors. Furthermore, cellular telephone service is still unavailable in many remote and undeveloped areas throughout the world. Even where cellular service is available, the use of cellular telephones is economically impractical for many high-volume commercial and industrial users, because of the relatively high prices charged by cellular telephone providers for each minute of service; such users often choose to use independently-owned two-way radio equipment in preference to a cellular telephone system.

It is therefore a primary object of the present invention to provide a communication system which permits a conventional facsimile transceiver to send and receive messages over a two-way voice radio transceiver.

A more specific object of the present invention is to provide a simulated telephone line interface to the facsimile transceiver such that a user may send and receive facsimile messages using operating procedures substantially the same as though the facsimile transceiver were connected to the public switched telephone network.

A further object of the present invention is to provide a modulator and demodulator means which convert audible tones received from the attached facsimile transceiver into digital image data which can be temporarily stored within the device for subsequent transmission over the connected radio, and conversely, which convert stored digital image data previously received from the connected radio into audible tones, so that received messages can be delivered to the connected facsimile transceiver for hard-copy printing.

A further object of the present invention is to provide a means of simulating the circuit switching action of the public telephone network by converting the destination station address "dialed" by the user at the facsimile transceiver into a digital address which is embedded within each block or "packet" of image data subsequently transmitted over the radio, and by further providing that only the addressed station will retain and deliver the message to its attached facsimile transceiver. This allows three or more devices to share the same radio channel.

A further object of the present invention is to provide a error detection and correction means which segment facsimile image data into packets of digital bits prior to transmission over the radio channel; which perform a mathematical operation on the data contained within each such packet to develop a unique cyclical redundancy check value for that packet; which embed this check within each packet at time of transmission; which continue to store each packet, after transmission, until positive acknowledgement of correct reception is received from the destination station; which upon reception of a packet of image data from another station, independently develop the check value for the data actually received, compares it with the transmitted check value, and then causes a response to be returned to the transmitting station acknowledging positively that the packet of data was successfully received, or negatively that an error was detected; which, after transmission of a packet of image data, upon reception of a positive acknowledgement, continue with the following packets of image data, or upon receipt of negative acknowledgement, or if no acknowledgement is received within a specified time, retransmit the packet of data; which contain mechanisms for successively repeating the transmission of image data packets that have not yet been successfully delivered; and which provide sufficient temporary image data storage capacity to hold transmitted and received packets of image data during the process of error detection and correction.

A further object of the present invention is to provide a voice radio interface means which include a modulator that encodes facsimile image data in the form of audio tones which can be transmitted over voice radios; which provide user-adjustable audio output levels, for compatibility with a wide range of existing and future voice radio equipment without requiring modification to such radios; which provide a connection point through which such audio output signals can be connected directly into the voice microphone input to a radio; which provide a push-to-talk signal to simulate the action of a user-activated talk button on a voice microphone, which signal is connected to the radio, and is activated to switch the radio from listen to talk whenever appropriate in order to transmit facsimile images; which provide a connection point that receives audio input signals from the speaker or earphone output of a radio; which provide automatic gain control to allow operation over a wide range of radio voice output levels; and which provide demodulation capabilities to convert audio tones back into image data.

SUMMARY OF HE INVENTION

The invention is directed to a communication system operable in conjunction with a two-way voice radio transceiver operable from an audio input signal and a transmit control input, and providing an audio output signal; and a facsimile transceiver including a telephone line interface for developing analog receive signals over a conventional voice telephone line. The system comprises storage means for storing digital data signals, first conversion means for converting the analog transmit signals to digital data signals for storage in the storage means for transmission, and for converting digital data signals in the storage means to analog receive signals for application to the facsimile transceiver for reception, second conversion means for developing from the stored digital data signals an audio input signal for application to the two-way voice radio transceiver for transmission; and for developing from the audio output signal a digital data signal for application to the digital storage means for reception, and control circuit means responsive to the operating state of the facsimile transceiver for controlling the first and second conversion means and the operation of the two-way voice radio transceiver.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 2 is a simplified block diagram illustrating that, with respect to the two-way voice radio, the radio-facsimile interface device effectively simulates a microphone and a speaker; and, with respect to the facsimile transceiver, the radio-facsimile interface device effectively simulates the voice telephone network.

DESCRIPTION OF THE PREFERRED EMBODIMENT

Figure 1:
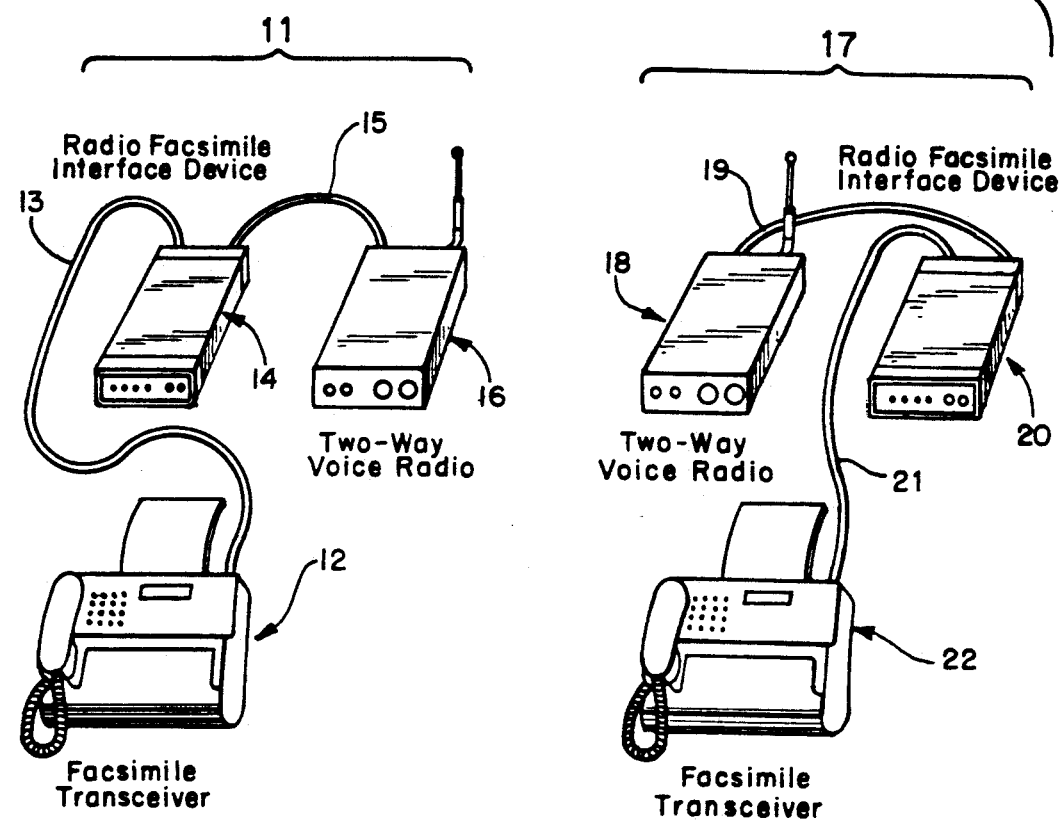
FIG. 1 shows two radio-facsimile communications systems comprising two stations, each consisting of a facsimile transceiver, a radio-facsimile interface device, and a two-way voice radio, together with interconnecting cables, illustrating a typical application of the invention.

Referring to FIG. 1, a radio-facsimile communications station 11 is seen to comprise a facsimile transceiver 12, connected via a cable 13 to a radio-facsimile interface device 14. Radio-facsimile interface device 13 is connected via a cable 15 to a two-way voice radio 16.

A second and identical radio-facsimile communications station 17 comprises a two-way voice radio 18, a cable 19, a radio-facsimile interface device 20, a cable 21, and a facsimile transceiver 22. This second station 17 is typically located remotely from the first station 11, at a maximum distance determined by the range of the radio equipment employed.

In accordance with the invention a user is enabled to send a facsimile copy of a written message from one station to another in substantially the same manner as though operating on the voice telephone network. For example, the user places the original written document to be transmitted in the facsimile transceiver 12, and, using the ordinary facsimile calling procedure, dials the "telephone number" of the station to which he desires to send the message (each such station having been, by common agreement, assigned a unique number which is programmed into its respective radio-facsimile interface device by a suitable programming facility). The radio-facsimile interface device 14 provides all required voice telephone network signalling to the connected facsimile transceiver 12. It recognizes dual-tone multi-frequency (DTMF) and/or pulse dialing signals, generated by the facsimile transceiver 12, thereby decoding the "telephone number" of the station to which the user wishes to send a facsimile message.

When the user has finished "dialing", radio-facsimile interface device 14 sends audible tones, encoded as electrical signals, to two-way voice radio 16, which are transmitted to two-way voice radio 18 and decoded by the other radio-facsimile interface device 20. Radio-facsimile interface device 20 accordingly generates a telephone line ringing signal over cable 21 to its connected facsimile transceiver 22, preparing that device to accept a message, and also sends an answering response over two-way voice radio 18 back to the originating station 11, to signal that this station 17 is ready to receive the facsimile message.

Radio-facsimile interface device 14 now sends audible tones to originating facsimile transceiver 12 signifying that a "connection" has been made. Facsimile transceiver 12 proceeds to send the facsimile call set-up tones prescribed by applicable telecommunications standards, which are responded to by radio-facsimile interface device 14. Facsimile transceiver 12 now proceeds with its normal transmission mode: it scans the original document optoelectronically; converts black and white images into digital data; converts digital image data into audible tones; and transmits these tones over cable 13 to the radio-facsimile interface device 14.

Radio-facsimile interface device 14 converts the tones received from originating facsimile transceiver 12 back into the form of digital data. As will be subsequently described in more complete detail, radio-facsimile interface device 14 combines the original facsimile image data with station addressing information as well as error detection and correction information. It then re-encodes this combined information data into audible tones, and passes these tones over cable 15 to two-way voice radio 16.

Receiving two-way voice radio 18 passes received audible tones over cable 19 to radio-facsimile interface device 20, which demodulates these tones and converts them to digital data. Provided that the information has been received without error (as will be subsequently described), radio-facsimile interface device 20 re-encodes the digital image data into audible tones, and sends these tones over cable 21 to the receiving facsimile transceiver 22.

From the preceding description it will be seen that radio-facsimile interface devices 14 and 20, through their respective connections to two-way voice radios 16 and 18, automatically deliver a facsimile message from one radio-facsimile communications station 11 to the other station 17 without manual control of the communications link by the operator. In a like manner, the operator at radio-facsimile communications station 17 can send a facsimile message to station 11; the same procedure takes place, in the reverse direction.

FIG. 2 is a block diagram illustrating the radio-facsimile interface device simulating a microphone and a speaker (to the two-way voice radio) and the voice telephone network (to the facsimile transceiver).

Referring to FIG. 2, two-way voice radio 16 comprises a receiver stage 24 and a transmitter stage 25, either of which can be connected through an antenna switch 26 to a radio antenna 27. In its standby condition, the radio is in receive mode; the antenna 27 is connected through antenna switch 26 to receiver stage 24. In a typical voice-mode radio connection, receiver stage 24 is connected to a speaker 29, and a microphone 30 connects to transmitter stage 25. When a user wishes to speak, he depresses a push-to-talk switch 31 on the microphone activating a push-to-talk (PTT) stage 28 within the radio, which in turn conditions the antenna switch 26 into its transmit mode, connecting the antenna 27 to transmitter stage 25.

When the radio/facsimile interface device 14 is connected to the two-way voice radio 16, the radio receiver stage 24 is connected to a demodulator 33 which converts audible tones to digital data. Demodulator 33 accepts audible signals that would be connected to speaker 29 in a voice-mode system. The radio transmitter stage 25 is driven by a modulator 34 which converts digital data within the radio-facsimile interface device 14 to audible tones. Modulator 34 provides audible signals that would be generated by microphone 30 in a voice-mode system. The radio PTT stage 28 is controlled by transmit-receive control device 35. The transmit-receive control device 35 places the radio in transmit mode in the same manner as the push-to-talk switch 31 in a voice system.

Because the radio-facsimile interface device 14 in effect emulates the operation of a speaker 29 and microphone 30, it can be connected to a wide variety of two-way voice radios without modification to those radios, except that differing cable connections may be required for different radios.

FIG. 2 also shows facsimile transceiver 12 in simplified form. It includes an image scanner 48, which optoelectronically converts the image of an original document into digital data. This information is converted by a modulator 49 into audible tones. These tones are routed to a telephone line interface 50.

Telephone line interface 50 also connects to a demodulator 52, converting received audible tones into digital data. This information is sent to a thermal printer 53, which reproduces the image of the original document transmitted from a compatible facsimile transceiver.

In a telephone line application, facsimile transceiver 12 is connected through a telephone cable 51 to a telephone jack 46, which is a terminal on a switched voice telephone network 42. The local telephone exchange 43 provides a gateway into the telephone network, and makes connections to other exchanges 54 and 55 in response to the number dialed by the originating party.

When facsimile transceiver 12 is connected to radio/-facsimile interface device 14, telephone line cable 51 connects to telephone receptacle 41. The radio-facsimile interface device 14 contains a telephone line simulator 36, which simulates the operation of the switched telephone network 42. This telephone line simulator 36 furnishes telephone line loop current; recognizes when the facsimile transceiver goes off-hook, preparatory to dialing; generates an audible "dial tone" compatible with telephone network standards; recognizes dual-tone multi-frequency (DTMF) and/or pulse dialing signals, generated by the facsimile transceiver 12; and can generate a telephone line ringing signal.

Audible tones received by radio-facsimile interface device 14 via its telephone line simulator 36 from the attached facsimile transceiver 12 are converted by demodulator 38 into digital data. This information is stored by a digital image data control and storage section 40 for subsequent transmission to the distant receiver over the attached two-way voice radio 16.

Facsimile image data received by radio-facsimile interface device 14 from the attached two-way voice radio 16 is routed via a demodulator 33 to the digital image data control and storage section 40. Error-free image information is converted into audible tones by a modulator 37, and converted by telephone line simulator 36 into electrical signals appropriate to drive facsimile transceiver 12. A line control circuit 39 provides control of the telephone line simulation accomplished by telephone line simulator 36.

It should be noted that radio-facsimile interface device 14 does not simply change electrical levels in such a way as to route modulated audio tones directly and in real-time between two-way voice radio 16 and facsimile transceiver 12. Rather, radio-facsimile interface device 14 contains an independent modulator 34 and demodulator 33 for interface to two-way voice radio 16; an independent modulator 37 and demodulator 38 for interface to facsimile transceiver 12; and a digital image data control and storage section 40 for providing separate and independent control of data flow to and from two-way voice radio 16 and facsimile transceiver 12. These provisions are utilized to provide station addressing and error control.

Figure 3:
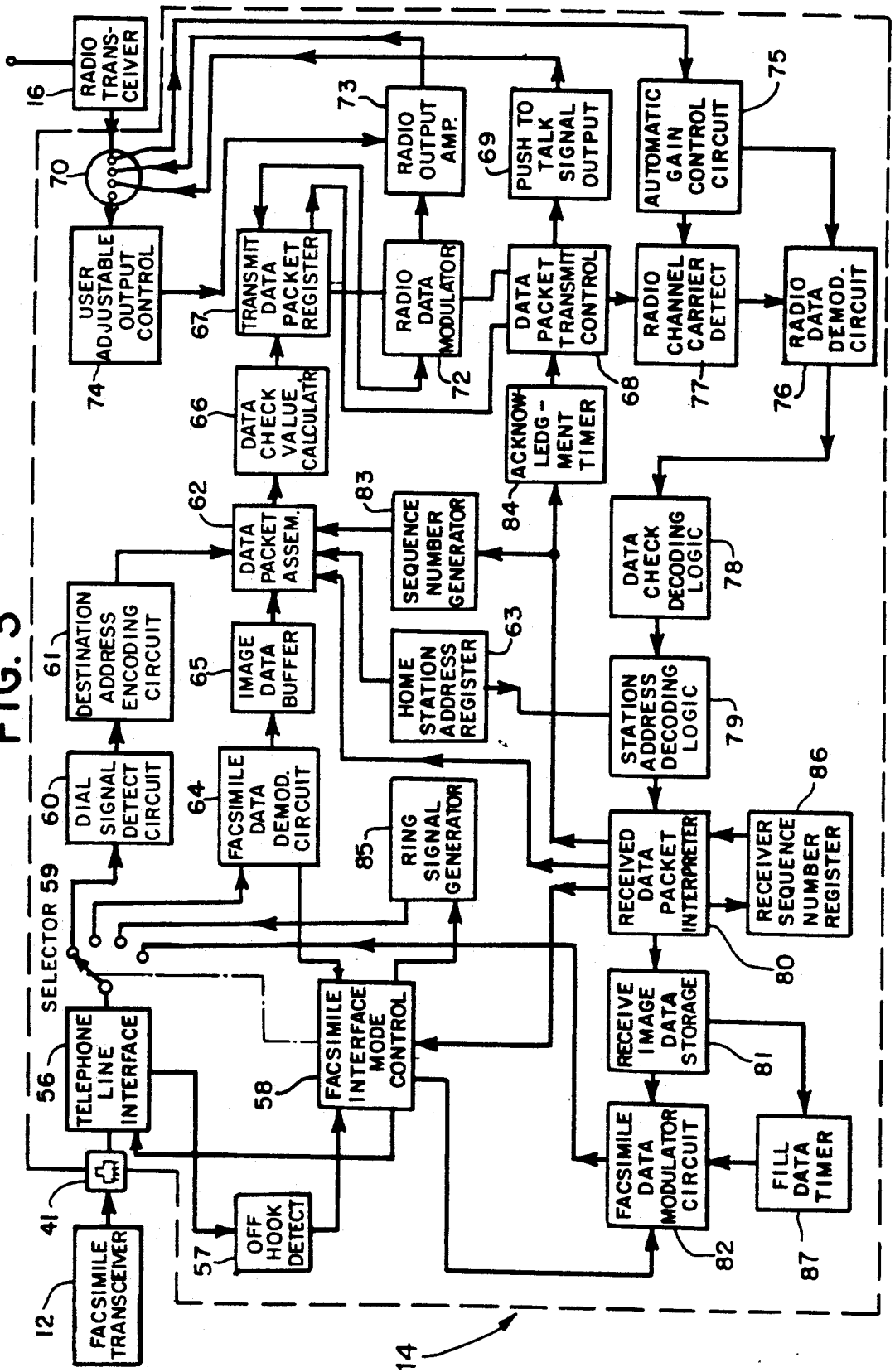
FIG. 3 is a simplified functional block diagram of the radio-facsimile interface device illustrating the station addressing and error detection and correction function of the device.

FIG. 3 provides an expanded view of the internal functions of the radio-facsimile interface device, particularly, with respect to the station addressing and error control functions.

Referring to FIG. 3, facsimile transceiver 12 connects via telephone jack 41 to telephone line interface 56. Telephone line interface 56 provides telephone line "battery" voltage to attached facsimile transceiver 12. Assume that the operator of facsimile transceiver 12 wishes to originate a call. Facsimile transceiver 12 goes "off-hook" by closing an internal switch or relay contact, drawing loop current from the voltage provided by telephone line interface current 56. This loop current is detected by off-hook detector circuit 57, which provides a signal to facsimile interface mode control circuit 58, which in turn causes selector switch 59 to connect telephone line interface 56 to dial signal detect circuit 60. Dial signal detect circuit 60 receives DTMF tones or dial pulses from attached facsimile transceiver 12. Upon completion of dialing—either upon reception of a predetermined number of digits, or upon reception of a predetermined terminating digit or symbol (such as the "#" symbol)—dial signal detect circuit 60 transmits the station number dialed to destination address encoding circuit 61.

Data packet assembler 62 assembles an initial data packet which includes the destination station address received from destination address encoding circuit 61 in binary digital form. Data packet assembler 62 also includes the address of this radio-facsimile communications station, as programmed by the installer and contained in a home station address register 63. Since no image data has as yet been accumulated from the transmitting facsimile transceiver 12 by image data demodulator circuit 64 and image data buffer 65, this data packet does not contain image data. Data packet assembler 62 instead inserts a digital code indicating that this data packet is a connection request data packet, rather than an information transfer data packet. Data packet assembler 62 forwards the data packet to data check value calculator 66, which appends a cyclical redundancy check (CRC) value to the data packet (to be explained in further detail below), and forwards the modified data packet to transmit data packet register 67. Transmit data packet register 67 generates a signal to data packet transmitter control 68 indicating that a data packet is ready to transmit. Provided that the radio channel is not already busy, data packet transmit control 68 energizes push-to-talk signal circuit 69, which is connected through a radio connector 70 to radio transceiver 16, causing the transceiver to switch from receive to transmit. Data packet transmit control 68 also signals a radio data modulator circuit 72 to begin generating audible tones, which are amplified by a radio output amplifier 73 to a suitable electrical level, then connected via radio interface connector 70 to radio transceiver 16. After suitable delays, both to allow radio transceiver 16 to switch to its transmit mode, and to allow radio modulator circuit 72 to complete its pre-data signal sequence, data packet transmit control 68 signals transmit data packet register 67 to transmit the stored data packet to radio data modulator circuit 72. Radio data modulator circuit 72 converts the digital data to audible tones, which are amplified by radio output amplifier 73 to a suitable electrical level, then connected via radio interface connector 70 to radio transceiver 16.

Since different models of radio transceiver 16 may require differing signal strengths to provide effective operation, a user-adjustable output control 74 allows the equipment installer to program a specific output level.

After the initial data packet is transmitted, data packet transmit control 68 reconditions push-to-talk signal circuit 69 to its receive status, and radio transceiver 16 returns to its receive mode.

If the distant radio-facsimile communications station receives the data packet just transmitted, it returns an acknowledging data packet to this radio-facsimile communications station. The received audio signal from radio transceiver 16 is coupled through radio interface connector 70 to an automatic gain control circuit 75, which automatically adjusts for variations in radio receive levels and passes audio tones to a radio data demodulator circuit 76.

Automatic gain control circuit 75 also passes audio tones to a radio channel carrier detect circuit 77, which develops a signal indicating the presence of a data carrier signal on the radio channel. This signal is connected to radio demodulator circuit 76, helping to prevent radio demodulator circuit 76 from falsely interpreting radio noise as data. The signal developed by radio channel carrier detect circuit 77 is also connected to data packet transmit control circuit 68 inhibiting the station from attempting to transmit when another signal is already present on this radio channel.

Radio demodulator circuit 76 converts received audible tones into digital data, passing the information to a data check decoding logic circuit 78. Data check decoding logic circuit 78 removes the CRC embedded in the received data packet, then independently calculates a CRC check on the remainder of the received data packet. If the CRC check so calculated does not agree with the CRC included in the received data packet, data check decoding logic circuit 78 discards this data packet. If the CRC agrees, it passes the data packet to a station address decoding logic circuit 79.

Station address decoding logic circuit 79 examines the address to which the packet was addressed, comparing this address to the address of this radio-facsimile communications station, as contained in home station address register 63. If these addresses do not compare, the data packet is intended for another radio-facsimile communications station and is discarded. If the address contained in the received data packet indicates that it is intended for this radio-facsimile communications station, station address decoding logic circuit 79 passes the data packet to received data packet interpreter circuit 80.

In the case just described, received data packet interpreter 80 finds within the data packet a control code indicating that the distant radio-facsimile communications station is ready to accept a connection, in response to the connect request data packet just sent. Received data packet interpreter 80 now sends a signal to facsimile interface control circuit 58, indicating that the system is ready to receive a facsimile message from connected facsimile transceiver 12. Facsimile interface mode control circuit 58 switches selector switch 59 to connect telephone line interface circuit 56 to facsimile data modulator circuit 82. Facsimile interface mode control 58 then causes facsimile data modulator circuit 82 to send facsimile connect signals via telephone line interface circuit 56 to the connected facsimile transceiver 12, commanding the facsimile transceiver to start transmitting image data. After these connection signals are sent, facsimile interface mode control circuit 58 causes selector switch 59 to connect telephone line interface 56 to image data demodulator circuit 64.

At this point the connected facsimile transceiver 12 starts sending image data, encoded in the form of audio tones, in a continuous flow, one page at a time, according to the facsimile data communications protocol established by international standards.

Image data demodulator circuit 64 converts these audible tones into digital image data which are stored in image data buffer 65. Periodically data packet assembler 62 accepts a packet of image data and assembles a data packet for transmission. Because the effective speed at which data packet assembler 62 can assemble and dispatch data packets varies depending on the effective through-put of the data link over the radio, image data buffer 65 provides sufficient data buffer capacity to store a substantial amount of facsimile image data.

Data packet assembler circuit 62 now creates data packets which each include the following: a control code indicating that the data packet contains facsimile image data; the destination station address, as determined by destination address encoding circuit 61; the home station address, from home station address register 63; a sequence number generated by a sequence number generator circuit 83; and the facsimile image data. The sequence number generated by sequence number generator 83 is an arbitrary packet serial number which is incremented each time a packet is successfully transmitted. Each such data packet is passed to data check value calculator 66, which appends a CRC to the data packet, and forwards the modified data packet to transmit data packet register 67 as previously described.

The distant radio-facsimile communications station acknowledges each correctly received data packet by sending back an acknowledgement data packet. Assuming that this acknowledgement packet is received without error, it finds its way (via the stages previously described) to received data packet interpreter circuit 80. Received data packet interpreter 80 recognizes that this is an acknowledgement packet, and signals data packet assembler 62 to assemble the next block of image data in image data buffer 65 for transmission. Upon decoding an acknowledgement packet, received data packet interpreter circuit 80 also sends a signal to sequence number generator 83, which accordingly increments to the next sequence number, which will be embedded within the next succeeding data packet. Received data packet interpreter circuit 80 also send this packet acknowledgement signal to an acknowledgement timer circuit 84.

Each time that data packet transmit control 68 causes a data packet to be transmitted, it starts acknowledgement timer 84. The period of this timer is set to a time period long enough for the distant radio-facsimile communications station to receive the data packet, and to acknowledge it. If such acknowledgement is timely received, then the acknowledgement signal from received data packet interpret 80 resets acknowledgement timer 84 before the timer expires. However, if acknowledgement timer 84 times out without having received such acknowledgement signal, it sends a signal to data packet transmit control circuit 68 causing data packet transmit control circuit 68 to repeat transmission of the same packet. The purpose of acknowledgement timer circuit 84 is thus to prevent failure of the communications link in the event that an earlier packet transmission was not properly received and acknowledged.

It will sometimes happen that a transmitted data packet is correctly received by the distant radio-facsimile communications station, which sends back a suitable acknowledgement packet—but the acknowledgement packet encounters interference which causes its bits to be garbled. Such an acknowledgement packet will be rejected by data check decoding logic circuit 78, and will be discarded. After a time, acknowledgement timer circuit 84 will cause the same packet to be retransmitted. The distant receiving station may well then receive the same packet correctly for a second time. Herein lies the purpose of the sequence number generator circuit 83; the sequence number will not have incremented, so the receiving station will decode a duplicate sequence number. It reacknowledges the packet, but does not pass the duplicated data on the attached facsimile transceiver.

When the originating facsimile transceiver 12 finishes sending a page, it drops its carrier (stops sending audible tones) and awaits a response. This loss of carrier is sensed by facsimile data demodulator circuit 64, which sends an appropriate signal to facsimile interface mode control circuit 58. Facsimile interface mode control circuit 58 switches selector 59 to connect telephone line interface 56 to facsimile data modulator circuit 82 and sends a response back to facsimile transceiver 12 indicating that it is ready to receive additional data. Facsimile interface mode control circuit 58 then switches selector 59 back to connect telephone line interface 56 to facsimile data demodulator circuit 64 to receive either the next page of facsimile images—in which case the above sequence continues; or a disconnect signal. Upon receipt of a disconnect signal, facsimile data demodulator circuit 64 sends a signal to facsimile interface mode control circuit 58, which in turn signals telephone line interface circuit 56 to disconnect from facsimile transceiver 12.

Even after originating facsimile transceiver 12 disconnects, image data will often remain as yet untransmitted with image data buffer 65. This data will continue being transmitted, packet by packet, until image data buffer 65 is empty. At that point, data packet assembler circuit 62 generates a disconnect packet to the distant radio-facsimile communications station.

Assuming that the radio-facsimile communications station is idle, and that the operator of a distant radio-facsimile communications station wishes to send a facsimile message to this station, radio transceiver 16 receives a signal which results in digital data being detected by radio data demodulator circuit 76. Provided that data check decoding logic circuit 78 finds no data errors, station address decoding logic circuit 79 attempts to match the address in the packet received, with its own address contained in home station address register 63. Provided a match is found, received data packet interpreter circuit 80 detects a connect request packet. If the unit is not already occupied, received data packet interpreter 80 sends a signal to data packet assembler 62 instructing it to return a connect acknowledge packet to the originator. This packet is transmitted as previously described for other forms of data packet.

Received data packet interpreter 80 also sends a connect signal to facsimile interface mode control circuit 58. Facsimile interface mode control circuit 58 in turn causes selector switch 59 to connect telephone line interface circuit 56 to a ring signal generator 85, generating a ringing signal to connected facsimile receiver 12. When facsimile transceiver 12 answers, it goes off hook, drawing loop current through telephone line interface 56, which is detected by off hook detect circuit 57, which in turn sends a signal to facsimile interface mode control circuit 58. Facsimile interface mode control 58 switches selector switch 59 to connect telephone line interface 56 to facsimile data modulator circuit 82; facsimile interface mode control 58 then causes facsimile data modulator circuit 82 to send facsimile connection signals via telephone line interface 56 to the connected facsimile transceiver 12, in effect commanding the facsimile transceiver to receive image data. After these connection signals are sent, facsimile interface mode control circuit 58 causes selector switch 59 to connect telephone line interface circuit 56 to image data demodulator circuit 64, which receives connection X signals from facsimile transceiver 12. Upon conclusion of these signals, demodulator circuit 64 sends suitable connection signals to facsimile interface mode control circuit 58, which switches selector switch 59 to connect telephone line interface circuit 56 to facsimile data modulator circuit 82 once again.

The distant originating radio-facsimile communications station commences to send image data packets. As received data packet interpreter circuit 80 decodes each new image data packet, it sends a signal to data packet assembler 62 to return an acknowledgement packet to the originating station. Received data packet interpreter 80 also decodes the sequence number which is embedded within each image data packet, as previously described. It compares the received sequence number with the value previously stored in a receive sequence number register 86. If the sequence number is the same, then this is a duplicate image data packet (as described above), and it is discarded. If the sequence number received is different from the previously stored sequence number, then received data packet interpreter 80 stores this new sequence number in receive sequence number register 86, and then forwards the image data contained in this new packet to a receive image data storage circuit 81.

Whenever image data is available in image data storage 81, it is sent to facsimile data modulator circuit 82 for transmission through telephone line interface circuit 56 to connected facsimile transceiver 12.

When image data is not immediately available, receive image data storage circuit 81 sends a signal to a fill data timer circuit 87, which sends a signal to facsimile data modulator circuit 82 causing it to interpose fill bits in the data sent to facsimile transceiver 12. If the buffer in the data sent to facsimile transceiver 12. If the buffer empty signal from receive image data storage 81 persists for a predetermined period, fill data timer 87 sends a signal to data modulator circuit 82 causing it to transmit the signal for a single blank scan line on the print-out of facsimile transceiver 12; this signal is necessary to prevent facsimile transceiver 12 from disconnecting from the telephone line interface circuit 56 according to the inactivity time-out provisions embodied in the facsimile communications protocol.

At the end of the facsimile message, after sending the last image data packet, the originating radio-facsimile communications station generates a disconnect packet, as previously described. Upon receipt of a correctly formatted disconnect packet, received data packet interpreter 80 monitors the buffer empty signal generated by receive image data storage 81 until all previously received image information has been sent to facsimile data modulator circuit 82, at which time received data packet interpreter 80 sends a disconnect signal to facsimile interface mode control 58. Facsimile interface mode control 58 proceeds to generate a disconnect sequence to attached facsimile transceiver 12 as previously described.

Figure 4:
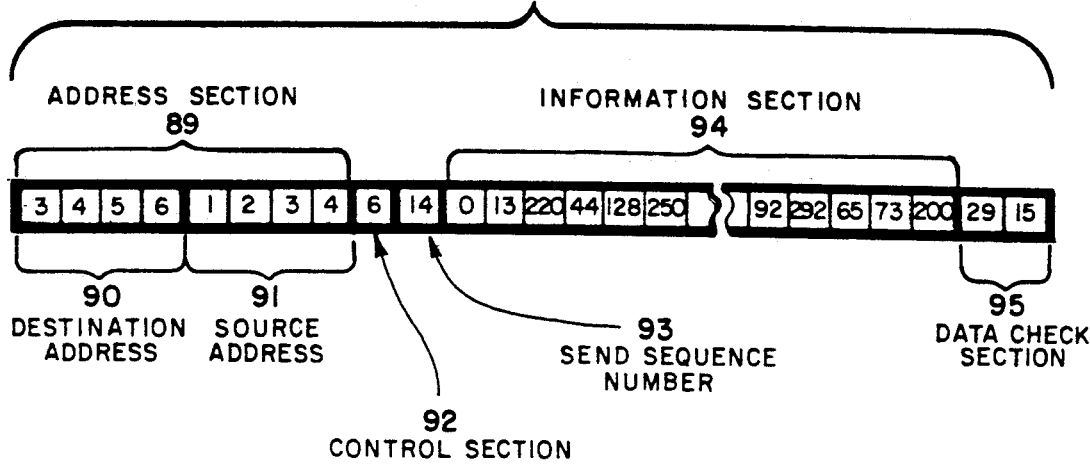
FIG. 4 illustrates the structure of a typical data packet, and the derivation the cyclical redundancy check (CRC) value thereof.

FIG. 4 shows the structure of a typical data packet 88. Each of the small data blocks within the data packet 88 represents a conventional eight-bit binary number (or octet) which can take on values from 0 to 255. An address section 89 contains a destination station address 90, followed by a source station address 91. FIG. 4 shows each address having four digits, but the actual sizes of these address fields can vary, depending on the addressing schemes chosen by the users of the system.

A control section 92 contains a coded data value indicating the type of packet. For example, possible packet types include 1) connection request; 2) connection acknowledgement; 3) image data transfer; 4) data transfer acknowledge; and 5) disconnect request. Obviously, other packet types could be provided to achieve additional link control functions within the scope of the invention.

A send sequence number 93 is present only when the packet is conveying data, notably for an image data transfer packet. It is an arbitrary number, 0 to 255, which is incremented each time a packet is transmitted and acknowledged.

An information section 94 is present only when the packet is conveying data, notably for an image data transfer packet. It may contain anywhere from a single eight-bit octet to over a thousand octets. These octets represent encoded facsimile images.

A data check section 95 contains a 16-bit cyclical redundancy check (CRC), generated at the transmitter. The 16-bit CRC is initialized to all binary 1's. Then, the multi-bit binary number which represents the address section 89, control section 92, send sequence number 93 (if present), and information section 94 (if present), all combined, is divided by the binary polynomial $x^{16}+x^{12}+x^5+1$. The one's complement of the 16-bit remainder after the aforesaid division is transmitted as the CRC.

At the receiver, the 16-bit CRC is initialized to all binary 1's. The multi-bit binary number (as defined above) actually received is first multiplied by $x^{16}$, then divided by the binary polynomial $x^{16}+x^{12}+x^5+1$. The 16-bit binary remainder resulting will be "0001 1101 0000 1111" ($x^{15}$ through $x^0$) in the absence of communications errors.

Thus, a communication system is described which, through use of a duplex packet transmission format, enables conventional facsimile apparatus to reliably communicate over a conventional two-way voice radio communication system without modification to either the facsimile apparatus or the transceiver apparatus of the radio communication system. In one preferred form, the system utilizes a novel packet protocol including data check and system control features which maximizes transmission accuracy and system efficiency, even under adverse conditions.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A communication system operable in conjunction with a two-way voice radio transceiver, operable from an audio signal and a transmit control signal, and providing an audio output signal, and a facsimile transceiver including a telephone line interface for developing analog transmit signals and recognizing analog receive signals over a conventional voice telephone line, and having predetermined signal timing requirements, said system comprising:

storage means for storing digital data signals;

first conversion means for converting the analog transmit signals from the facsimile transceiver to digital data signals for storage in said storage means for transmission, and for converting digital data signals in said storage means to the analog receive signals for application to the facsimile transceiver for reception;

second conversion means for developing from said stored digital data signals an audio signal for application to the radio transceiver for transmission, and for developing from the audio output signals of the radio transceiver a digital data signal for application to the digital storage means for reception;

said audio signal developed by said second conversion means for application to the radio transceiver being in packet format, each packet including at least one data check digit, and said second conversion means further including encoding means for encoding said data check digit in said developed audio signal, and for decoding said data check digit in the audio output signal received from the radio transceiver for verifying the integrity of received packets;

said second conversion means comprising means for generating a confirmation packet signal for application to the audio input of the radio transceiver upon receipt of a data packet form the radio transceiver including a valid check digit; and control circuit means responsive to the operating state of the facsimile transceiver, and to the presence of stored digital data signals in said storage means, for controlling said first and second conversion means and the operation of the voice radio receiver whereby the communication system meets to the timing requirements of the facsimile transceiver when said digital data storage means contain a deficit or surplus of digital data signals.

2. A communication system as defined in claim 1 wherein said control circuit means is responsive to a surplus of image data in said storage means such that, when said fist conversion means are receiving audio output signals from the facsimile transceiver, and a disconnect signal is detected indicating that transmission is complete, and digital data signals remain within said digital data storage means which have not yet been transmitted to the radio transceiver and confirmed, said digital data signals are transmitted until all such signals have been confirmed.

3. A communication system as defined in claim 1 wherein while audio input signals are being transmitted to the facsimile transceiver and no image data is present in said digital storage means, said control circuit means causes signals for a single blank scan line to be transmitted to the facsimile transceiver, whereby the connection timing requirements of the facsimile transceiver are met and the facsimile transceiver is prevented from disconnecting until all image data to be transmitted by the radio transceiver has been received and confirmed.

* * * * *